Figure 1:
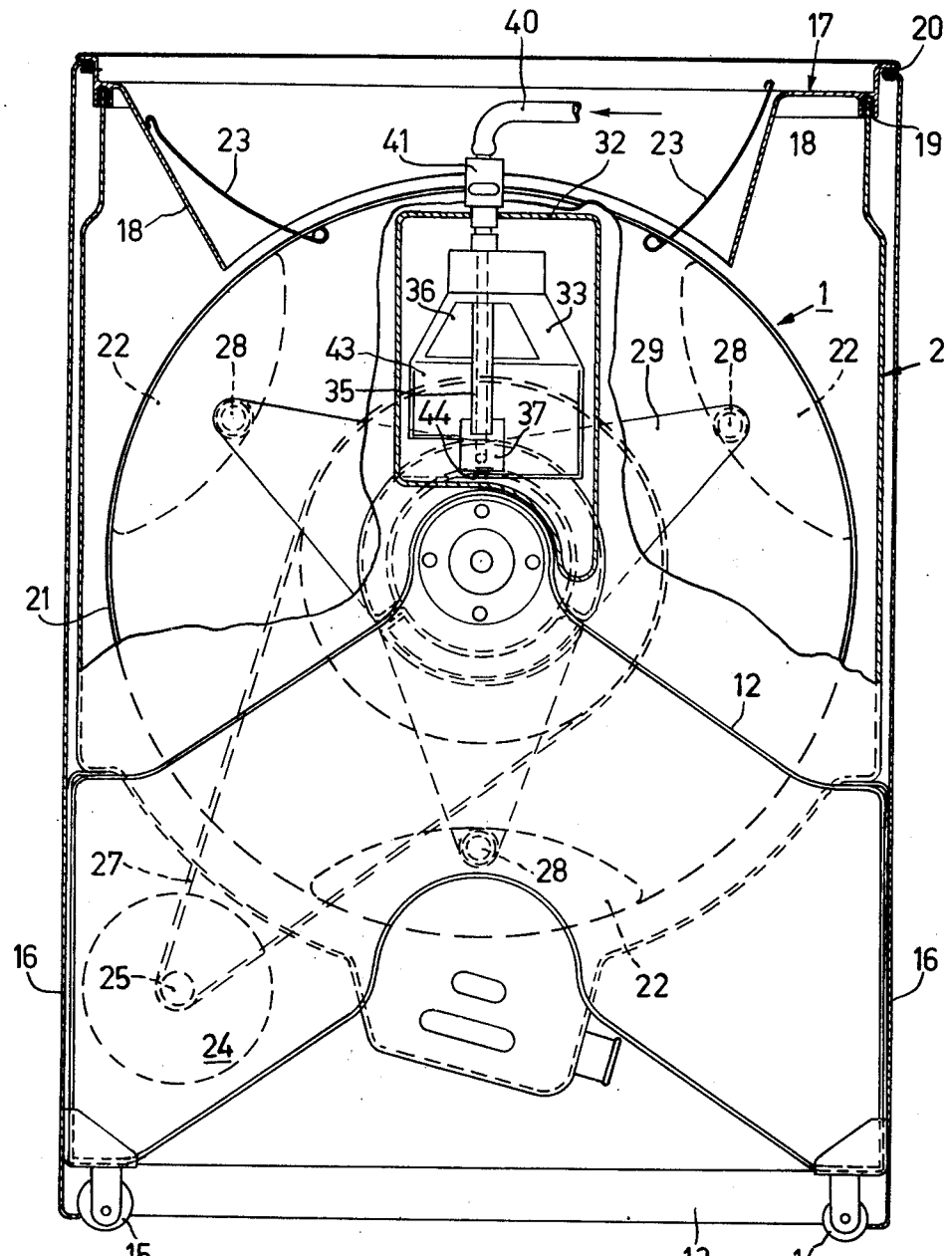

United States Patent [19]
Arkeveld et al.

[11] 3,983,035
[45] Sept. 28, 1976

[54] BALANCING DEVICE FOR A ROTATABLE DRUM WHICH MAY BE ECCENTRICALLY LOADED

[75] Inventors: Robert Josef Arkeveld; Hendrik Karel Moraal, both of Eindhoven, Netherlands

[73] Assignee: U.S. Philips Corporation, New York, N.Y.

[22] Filed: May 8, 1975

[21] Appl. No.: 575,455

Related U.S. Application Data

[63] Continuation of Ser. No. 458,551, April 8, 1974, abandoned.

[30] Foreign Application Priority Data

June 24, 1971 Netherlands .................... 7108702

[52] U.S. Cl. .............................. 210/138; 210/144; 68/23.2
[51] Int. Cl.² ........................................ B01D 33/02
[58] Field of Search ............. 210/138, 144; 68/23.2

[56] References Cited
UNITED STATES PATENTS

| | | |
|---|---|---|
| 2,610,523 | 9/1952 | Kahn .................................. 210/144 |
| 2,798,610 | 7/1957 | Meyer ................................. 210/144 |
| 3,135,688 | 6/1964 | Compans et al. ................... 210/144 |
| 3,799,348 | 3/1974 | Mazza ................................ 210/144 |

*Primary Examiner*—John Adee
*Attorney, Agent, or Firm*—Frank R. Trifari; David R. Treacy

[57] ABSTRACT

A balancing device for a rotatable drum which may be eccentrically loaded and provided with containers for a balancing material. A control mechanism for the flow of balancing material includes a member capable of oscillating movement as a result of eccentric drum movement for diverting the flow.

13 Claims, 9 Drawing Figures

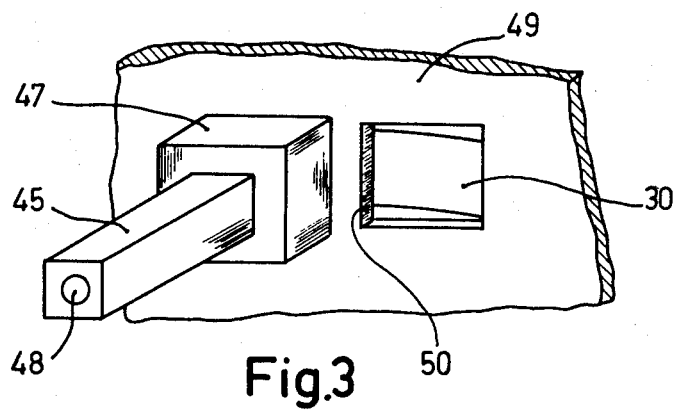
Fig.3
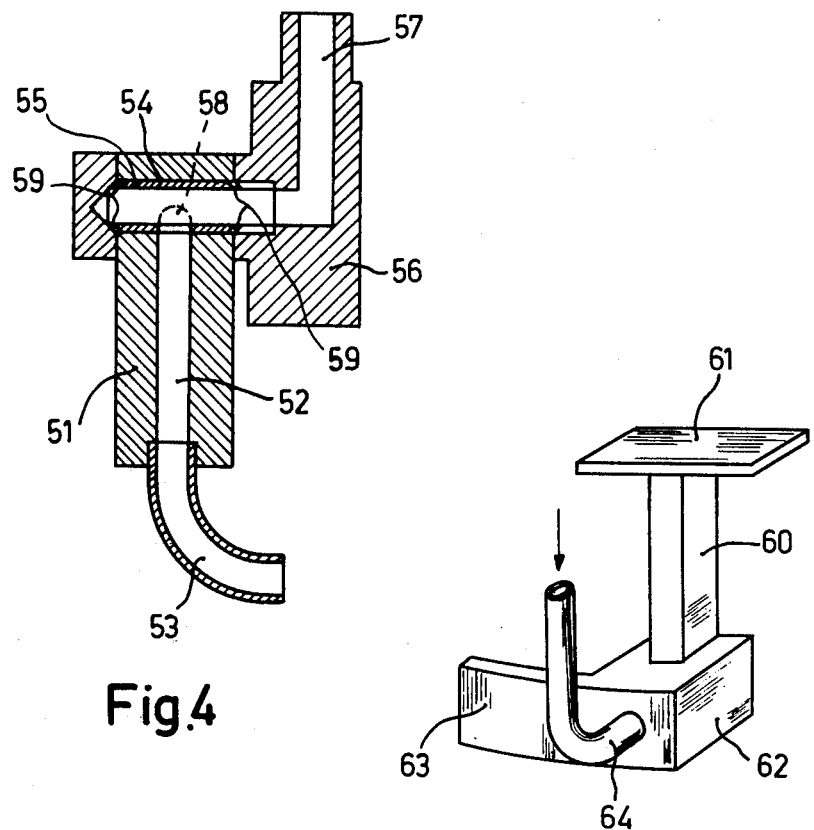
Fig.4
Fig.5

3,983,035

BALANCING DEVICE FOR A ROTATABLE DRUM WHICH MAY BE ECCENTRICALLY LOADED

This is a continuation of application Ser. No. 458,551, filed Apr. 8, 1974, now abandoned.

The invention relates to a balancing device for a rotatable drum which may be eccentrically loaded by uneven distribution of its contents and is provided with containers for balancing material, the device is provided with means for supplying this material to at least one of the containers and a control mechanism.

It is an object of the invention to provide a balancing device of the said type which at a rotation speed lower than the required maximum speed is capable of supplying a sufficient amount of balancing material to a location such that the imbalance forces due to uneven distribution of the drum contents around the circumference of the drum wall are reduced to an acceptable value.

A balancing device of the said type is known from U.S. Pat. No. 3,135,688. In this known construction the horizontal component of the drum movement is used to periodically move a nozzle which is pivotable about a vertical axis to within the range of the containers by means of a gearing. The movement of the drum relative to another machine component is utilised. However, such a construction cannot always be used and further the gearing involves the use of a large number of component parts, which may adversely affect both the cost and the useful life and reliability.

The invention which provides improvement in these points is characterized in that the control mechanism includes a first member which is capable of performing an oscillating movement both independently of the drum movement and in response to the drum movement, which in conjunction with a second member controls the flow of the balancing material, and which is located in the flow path of this material.

It should be noted that British patent specification No. 1,268,597 describes a balancing arrangement which has a rotating control member which is able, under the influence of centrifugal force acting on it, to take up a position relative to the drum which is determined by the location of an imbalance in the drum.

The device according to the invention has the advantages of simple construction, a minimum number of moving parts, low cost, reliable operation and high sensitivity.

An advantageous embodiment of the invention is characterized in that the first-mentioned member is in the form of a strip of a flexible material one end of which is clamped. In another embodiment this member may be in the form of a rod one end of which is pivotally fastened.

Further, it is of advantage for the first-mentioned member to be capable of passing balancing material, whilst the member may be provided with an orifice at its free end.

Alternatively, as will be set out more fully hereinafter, the first-mentioned member may take the form of a roller or ball and may form part of a control mechanism which determines the direction of flow of the balancing material.

In general it is advantageous for the first-mentioned member to form part of a mass-spring system, whilst said member itself may also be made of a resilient material, such as butyl rubber.

An advantageous embodiment in which the drum is rotatable about a substantially horizontal axis is characterized in that the first member is disposed above the rotation axis.

In a preferred embodiment the device forms part of a textile washing and spin-drying machine of a type in which the drum is mounted for rotation in a tub. In this embodiment it is of advantage for the tub to be rigidly secured to a frame supported by rollers. Another advantageous embodiment is characterized in that the tub is mounted in a frame so as to be capable of performing an oscillating movement relative to this frame. Finally it is of advantage for the arrangement to be provided on the wall of the tub.

The above and further advantage of the present invention will become apparent upon consideration of the following detailed description of embodiments thereof, taken in conjunction with the accompanying drawings.

Figure 2:
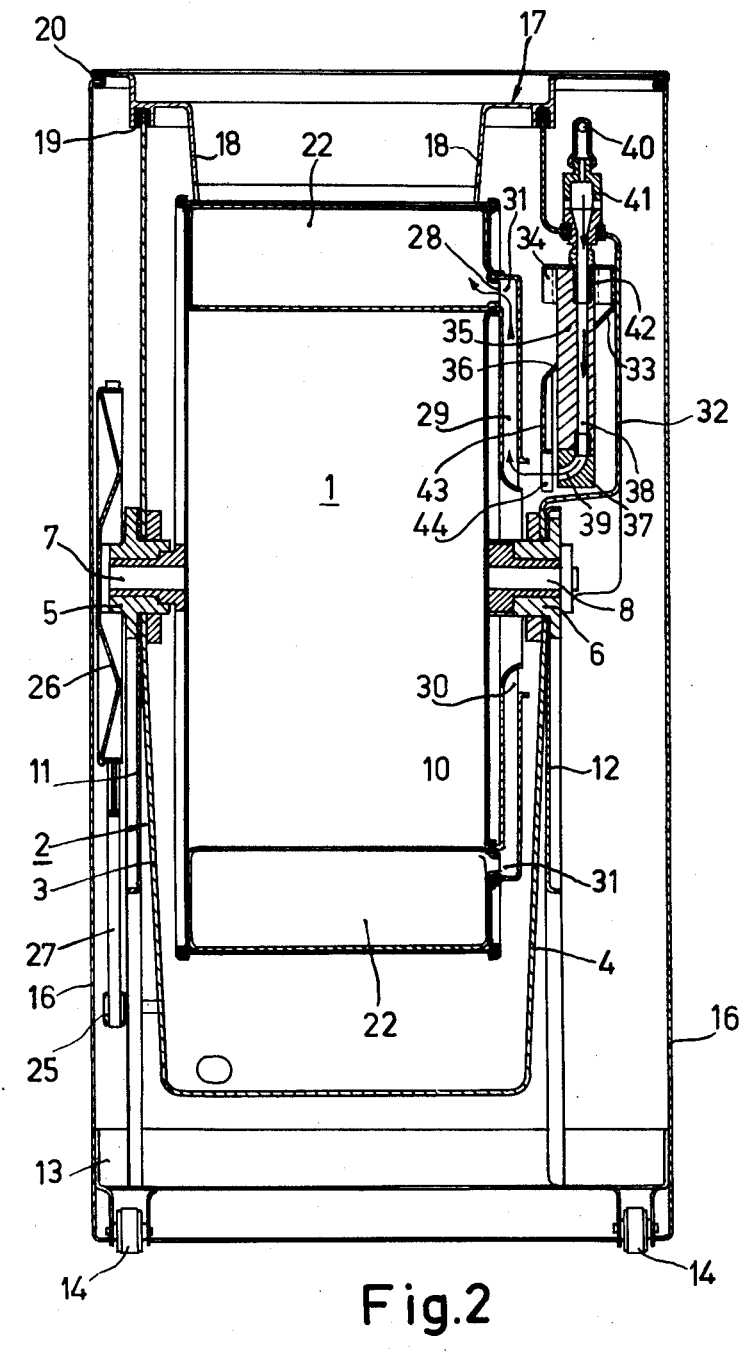
Figure 6:
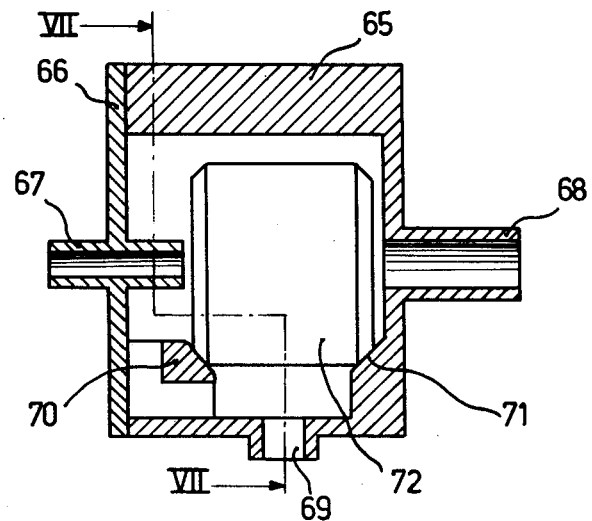
Figure 7:
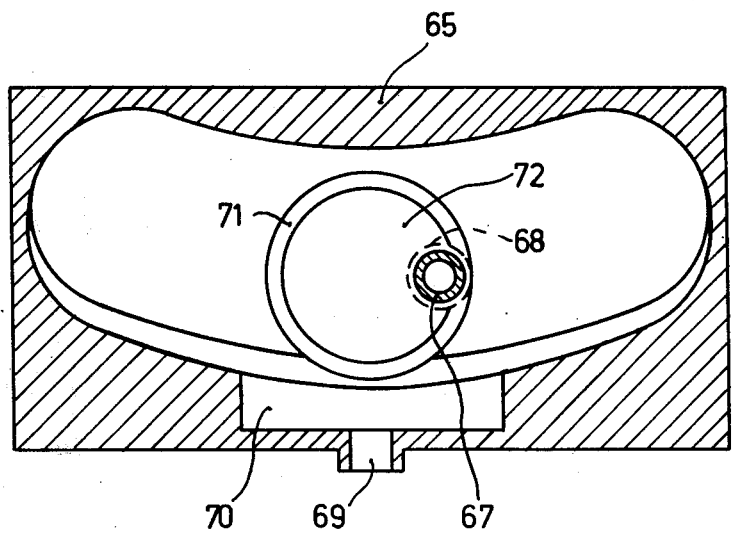
Figure 8:
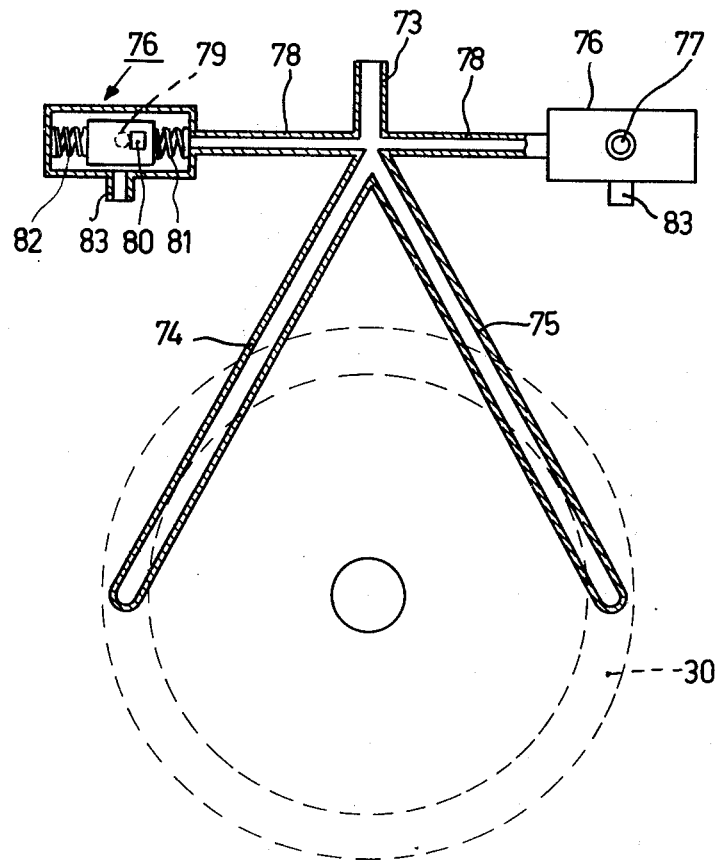
Figure 9:
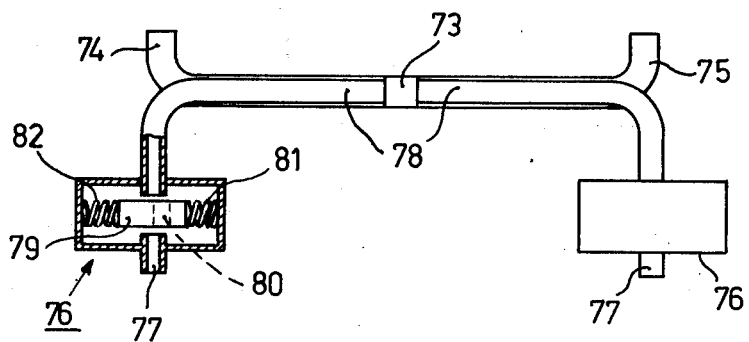

In the drawings:

FIG. 1 shows a drum washing machine, partly in elevation and partly in a sectional view taken at right angles to the axis of the drum of this machine, FIG. 2 is a sectional view of this drum washing machine taken on the axis of the drum, FIG. 3 is a schematic perspective view of a second embodiment of the invention, FIG. 4 is a schematic sectional view of a third embodiment, FIG. 5 is a schematic perspective of a fourth embodiment, FIG. 6 is a cross-sectional view and FIG. 7 is a longitudinal sectional view, taken on the line VII—VII of FIG. 6, of a fifth embodiment, and FIG. 8 is a schematic elevation and FIG. 9 is a schematic top plan view of a sixth embodiment of the invention.

The drum washing machine shown in FIGS. 1 and 2 has a wash drum 1 which is rotatable in a tub 2. For this purpose the cylindrical drum 1 is provided with axles 7 and 8 capable of revolving in sliding bearings 5 and 6 which are connected to supporting plates 11 and 12. These plates are supported at their lower surfaces by a frame 13.

The front and rear walls 3 and 4 of the tub 2, which is made of polypropylene, are also secured to the bearings 5 and 6, respectively, so that the tub 2 is also supported by the plates 11 and 12.

The frame 13 rests on four rollers two of which 14 are mounted concentrically with their rims, whilst the other two 15 are mounted with their axes eccentrically relative to their rims. The latter rollers not only serve as supports but also restrict horizontal motion of the machine. The frame 13 further serves as a support for the cabinet of the machine which consists of vertical enamelled metal panels 16.

On the upper rim of the tub 2 there is mounted a cover plate 17 which is provided with a funnel-shaped opening 18, a circumferential channel 19, into which the upper rim of the tub 2 fits with the interposition of a rubber sealing strip, and a circumferential flange 20 for joining to the cabinet 16, with the interposition of a sealing strip also.

The drum 1 comprises a stainless steel cylinder 21 and two flat walls 9 and 10. This drum accommodates three water containers 22 disposed against the cylinder wall 21 and the function of which will be explained hereinafter.

The parts of the cylinder wall 21 between the containers 22 are perforated, so that water from the tub 2 can enter the drum through these perforations. The drum is further provided with two doors 23 in its cylindrical wall. The drum is driven by an electric motor 24 by means of pulleys 25 and 26 and a belt 27. The pulley 26 is mounted on the axle 7 of the drum.

The aforementioned water containers 22 disposed against the inner surfaces of the wall 21 of the drum form part of the balancing arrangement. The three containers are arranged at equal angular distances of 120° and, as is shown in FIG. 1, their cross-sections are chosen so that they are also capable of setting and maintaining the drum contents in motion. The containers 22 have water inlet and outlet openings 28 at the side of the lateral drum wall 10, which for this purpose has three holes formed in it. To these openings is connected a star-shaped water manifold 29 which is mounted to the wall 10 of the drum concentrically with the drum axis and which mainly comprises three funnel-shaped parts the inlet portions 30 of which are located nearer the drum axis and are annular segments adjacent to one another, whilst outlets 31 are connected to the openings 28 of the containers 22. This is shown in FIGS. 1 and 2, whilst when considering FIG. 2 it should be borne in mind that for the sake of clarity the upper half of the sectional view of the drum is turned through an angle of 60° relative to the remainder of the Figure.

The remaining parts of the balancing arrangement are disposed in a bulging part 32 of the tub wall 4. A bracket 33 is secured to the inner surface of this wall. The bracket has an upper horizontal part 34 to which a rubber strip 35 is secured by vulcanizing. This strip passes through an opening 36 in the bracket 33 and at its lower end carries a brass block 37. Owing to this suspension from the rubber strip 35 the block 37 is capable of performing a swinging movement in a plane at right angles to the drum axis.

The strip 35 is made of butyl rubber in view of the long life of this material in moist surroundings.

The strip 35 and the block 37 are bored; the strip has bore 38 which extends in its direction of length and the bore 39 in the block registers with that in the strip, but has an outlet which opens in a horizontal direction. At its upper end the bore 38 in the strip 35 is connected to a water supply conduit comprising the supply conduit proper, which accommodates a stop valve (not shown) and is connected to the water supply mains, a airbreakup device 41 to satisfy the requirements of public water mains services, and a pipe 42 which extends into the strip 35 and forms the connection to the duct 38, 39.

In the inoperative position of the block 37 the orifice of the duct 39 is directed to the annular inlet opening 30 of the water manifold 29. However, a vertical portion 43 of the bracket 33 is inserted in the path of the emerging water jet. From this vertical portion part has been cut away so that an edge 44 is produced. In the case of swinging movement of the block 37 the emerging water jet periodically passes this edge and water may reach the inlet opening 30. When the jet is obstructed by the vertical portion 43 of the bracket 33 then the emerging water will be deflected back into the bulge 32 in the tub 2 and will drain away down the side 4. The frequency at which this is effected is equal to the number of revolutions per min. of the drum. When the drum contents are unevenly distributed, rotation of the drum gives rise to a horizontal oscillating movement of the machine with a consequent swinging movement of the block 37, but a certain phase shift between the movements of the machine and those of the block must be allowed for. In this connection the location of the balancing mechanism above the drum axis is of advantage, because this arrangement reduces the phase difference by 90° compared with that which would occur if the mechanism were located beside the drum axis.

Tests have shown that in a washing machine of usual size designed for performing a washing operation at a drum speed of about 50 r.p.m. and a spin-drying operation at a drum speed of from 700 to 1000 r.p.m., the balancing arrangement should most advantageously become operative at a speed of from 200 to 300 r.p.m. The amplitudes of the movements of the machine and of the block 37 and the phase difference between those movements will then be most advantageous for causing the water which emerges from the orifice of the block 37 to enter that container 22 which is in the highest degree opposite to the eccentric load of the drum. That the arrangement becomes operative at the correct instant is ensured by a timer switch of the machine (not shown) which controls the order and duration of the various stages of the washing program. At the correct instant this timer applies a signal to the afore-mentioned valve in the conduit 40 so that this valve opens and admits water to the balancing arrangement.

After the balancing process has proceeded for some time, during which water has flowed into appropriate containers 22, the timer gives another command by which the supply of water is terminated. The time during which the balancing operation must be completed has been determined empirically and chosen so that the most extreme requirements can be satisfied. If this period should be too long, this has no adverse effect on the balancing, because in this event the horizontal movements of the machine and of the block 37 will substantially have ceased and any emerging water strikes the vertical portion 43 of the bracket 33 and hence cannot reach the containers 22.

Obviously, the time alternatively may be made to depend upon the results of the balancing operation, but this requires additional means which naturally increase the cost price of the machine.

It should be noted that within the scope of this application the swinging motion of the block 37 is to be regarded as an oscillating motion. The same applies to the motion of corresponding members in embodiments of the invention to be described hereinafter.

The strip 35 need not extend vertically. FIG. 3 shows schematically an embodiment in which a strip 45 extends horizontally and moves a block 47 secured to it in a horizontal plane. Water passes through a duct 48 in the strip and in the block and the emerging water reaches the inlet opening 30 in the same manner as described with reference to the preceding embodiment. A plate 49 is provided the edge 50 of which has the same function as the edge 44 of the plate 43.

Instead of a strip made of a flexible material, a pivotally suspended pendulum made of a stiff material may be used. FIG. 4 shows an example of such an arrangement. A pendulum 51 which is provided with a bore 52 and a spout 53 has a horizontal bore 54 formed in its upper end into which fits a likewise bored stub 55. This stub is mounted in a plate 56 which is secured to the tub wall 32.

This plate is also provided with a duct 57 by which the supply pipe 40 is connected to the duct 54 in the stub 55. The stub further is provided with an outlet 58 in its cylindrical wall, which outlet has the form of a slot which registers with the duct 52 in the pendulum 51.

In this embodiment the friction between the pendulum 51 and the stub 55 determines the balancing sensitivity. This friction is reduced to a minimum by the use of a water bearing. For this purpose water supply holes 59 are provided, while the water may flow away from the bearing through the outlet 58.

It is not essential for the oscillating member, such as the strips 35 and 45 or the pendulum 51, to serve also for passing the balancing material. FIG. 5 shows schematically how a jet of water flowing from a fixed pipe 64 may periodically be interrupted by a member comprising a strip 60 of a resilient material which is weighted by a block 62 secured to its lower end, the upper end being secured to the tub wall 32 and 61.

As is indicated by 63, the block 62 may be shaped into a form suitable to prevent water from flowing along the rear surface of the block when the block is deflected to the right (in the figure).

FIGS. 6 and 7 show an embodiment of the arrangement according to the invention in which a roller is capable of allowing or preventing the flow of water to the balancing containers 22. In this embodiment the control mechanism comprises a housing 65, which may be secured to the tub wall of the machine and has a cover 66. In the cover 66 an inlet 67 for the balancing material has been formed, while opposite this inlet an outlet 68 for this material is provided in the rear wall of the housing 65, which outlet is directed to the opening 30 in the sidewall of the drum. In each opening 67 and 68 there is mounted a pipe so that the axes of the pipes coincide, while the diameter of the pipe in the opening 67 is smaller than that of the pipe in the opening 68. The housing 65 has a further opening 69 in its bottom for discharging balancing material which is supplied through the opening 67 but does not reach the opening 68.

Between the two pipes there are provided in the housing 65 two races 70 and 71 for a roller 72 the diameter of which is such that it is capable of completely interrupting the flow of balancing material from the opening 67 to the opening 68. As FIG. 7 shows, the races slope slightly upwards on either side of the openings.

If now the machine component to which the housing 65 is attached is set into motion owing to the presence of an imbalance force, the roller 72 will perform a movement relative to the housing 65 and will periodically, but with a certain phase difference relative to the motion of the housing, allow flow from the inlet 67 to the outlet 68. When the housing 65 is suitably located, for example above the axis of the rotating drum 1, the water will flow from the outlet 68 into the opening 30 of the drum 1 and enter the correct container 22.

In the embodiment shown in FIGS. 8 and 9 the Coanda effect is utilized. Water is supplied to the containers 22 from a supply pipe 73 via either of the branches 74 or 75 to the opening 30 in the sidewall of the drum. Through which of the two branches the supply is effected is determined by two devices 76 which each comprise a housing to which two aligned pipes 77 and 78 are connected, the pipes 77 being water supply pipes and the pipes 78 being pipes connecting a housing 76 to the point at which the pipe 73 divides into the branches 74 and 75. In each housing 76 there is disposed between the ends of the pipes 77 and 78 a plate-shaped element 79 which is held in a central position by compression springs 81 and 82 and is provided with an opening 80 which, when it is registered with the pipes 77 and 78 permits a connection between these pipes. Each device 76 is arranged so that the plate 79 is disposed in a plane at right angles to the axis of the rotatable drum 1, and each device 76 is stationary, for example in that it is secured to the wall of the tub 2. Each plate-shaped element 79 together with the associated springs 81 and 82 constitutes a mass-spring system which on movement of the drum due to an imbalance force is set into motion so as to periodically establish a connection between the pipes 77 and 78, so that alternately the branch 78 to the left and that to the right of the supply pipe 73 will have pressurised water supplied to it, so that the water flowing through the pipe 73 will alternately flow through the branch 74 and the branch 75. An advantage of this embodiment is that it enables the supply of water to the opening 30 to continue during substantially the entire revolution of the drum.

The described embodiments of the invention do not constitute an exhaustive enumeration of the possibilities of the invention. For example, a pendulum as described in the embodiments of FIGS. 1 to 5 may operate a microswitch so that via an electrically operated valve the supply of balancing material may be effected or interrupted. Furthermore such a pendulum may have a magnet provided at its lower end so as to close a reed contact during part of its reciprocating movement, with the same consequences for the supply of balancing material.

It should be noted that it is possible to provide both drum end faces with inlets for the containers 22 and to divide each container into two parts by a radially arranged partition. If then the water supply on either side of the partition is controlled in the same manner as described hereinbefore with respect to one side, dynamic balancing is possible.

What is claimed is:

1. In a balancing device for balancing an eccentrically loaded rotatable drum of the type comprising a drum, a plurality of containers carried on said drum for receiving and holding balancing material, each container having inlet and outlet openings, means for supplying balancing material to at least one of said containers, means for mounting said drum to permit rotation of said drum with respect to the mounting means and to permit eccentric movement of the drum, said mounting means undergoing similar eccentric movement in response to eccentric movement of the drum, and a control mechanism for controlling the amount and timing of balancing material supplied to said containers in response to eccentric movement of said mounting means, the improvement wherein said supplying means comprises means for intermittently supplying a flow of balancing material along a path to an inlet region, said means for intermittently supplying comprising a first movable member, and means for conducting said flow of material from said inlet region to successive ones of said inlet openings in sequence as said drum rotates, said control mechanism comprises means for coupling said first movable member to said mounting means for freely oscillatory movement in response to said eccentric movement and for developing a restoring force biasing said movable member toward a central position when said movable member is displaced from the central position, said restoring force being approximately proportional to the instantaneous distance by which said movable member is displaced from said central position along one rectangular coordinate direction, said central position being fixed in position with respect to said mounting means, said first movable member being so arranged with respect to said inlet region as to divert all of said flow from said path to the inlet region while in said central position, and permit substantially all of said flow to pass to the region while in a given position, over a range of movement from the central toward the given positions an increasing proportion of said flow passing to said inlet region.

2. A balancing device according to claim 1 wherein said first member comprises a portion of a strip of flexible material one end of which is freely movable for oscillating movement, the other end of which is clamped.

3. A balancing device according to claim 1 wherein said first member comprises a portion of a rod one end of which is pivotally fastened.

4. A balancing device according to claim 2 wherein said strip of flexible material has a passage therethrough for passing balancing material.

5. A balancing device according to claim 4 wherein said passage extends from the clamped end to the free end, and first member further comprises an orifice at its free end communicating with the passage for directing the flow of balancing material.

6. A balancing device according to claim 1 wherein said first member is a roller and said coupling means comprises a curved track for said roller so disposed that said roller obstructs said path in said central position.

7. A balancing device according to claim 1 wherein said first member is a ball and said coupling means comprises a curved track for said ball so disposed that said ball obstructs said path in said central position.

8. A balancing device according to claim 1 wherein said first member comprises a part of a mass spring system.

9. A balancing device according to claim 1 wherein said first member is made of resilient material.

10. A balancing device according to claim 8 wherein said resilient material is rubber.

11. A balancing device according to claim 1 wherein said drum is rotatably mounted about a substantially horizontal axis, and wherein said first member is located above said axis of rotation.

12. In a textile washing and spin drying machine having a frame, a tub mounted in said frame, a drum mounted for rotation within said tub, said drum arranged for receiving a load capable of causing eccentric imbalance of said drum upon rotation thereof, means within said frame for causing rotation of said drum, means for balancing said eccentrically loaded drum comprising a plurality of containers carried on said drum for receiving balancing material and having inlet and outlet openings, and means mounted on a wall of said tub for supplying said balancing material to at least one of said containers in response to movement of said drum caused by imbalance, an improved mechanism for controlling the flow of said balancing materials to said containers wherein said supplying means comprises means for intermittently supplying a flow of balancing material along a path to an inlet region, said means for intermittently supplying comprising a first movable member, and means for conducting said flow of material from said inlet region to successive ones of said inlet openings in sequence as said drum rotates, said mechanism comprises means for coupling said first movable member to said mounting means for freely oscillatory movement in a plane in response to said eccentric movement and for developing a restoring force biasing said movable member toward a central position when said movable member is displaced from the central position, said restoring force being approximately proportional to the instantaneous distance by which said movable member is displaced from said central position along one rectangular coordinate direction, said central position being fixed in position with respect to said mounting means, said first movable member being so arranged with respect to said inlet region as to divert all of said flow from said path to the inlet region while in said central position, and permit substantially all of said flow to pass to the region while in a given position, over a range of movement from the central toward the given positions an increasing proportion of said flow passing to said inlet region.

13. In the machine according to claim 12, said tub being mounted on said frame so as to be capable of oscillating motion relative to said frame.

* * * * *